(12) United States Patent
Øverbye

(10) Patent No.: US 10,497,125 B2
(45) Date of Patent: Dec. 3, 2019

(54) BORDER TRACING

(71) Applicant: String Limited, Surrey (GB)

(72) Inventor: Johan Øverbye, Kongsberg (NO)

(73) Assignee: String Limited, Surrey (GB)

( * ) Notice: Subject to any disclaimer, the term of this patent is extended or adjusted under 35 U.S.C. 154(b) by 122 days.

(21) Appl. No.: 15/310,068

(22) PCT Filed: May 13, 2015

(86) PCT No.: PCT/GB2015/051403
§ 371 (c)(1),
(2) Date: Nov. 9, 2016

(87) PCT Pub. No.: WO2015/173563
PCT Pub. Date: Nov. 19, 2015

(65) Prior Publication Data
US 2017/0278248 A1    Sep. 28, 2017

(30) Foreign Application Priority Data

May 13, 2014 (GB) .................................. 1408497.4

(51) Int. Cl.
*G06T 7/13* (2017.01)
*G06T 7/12* (2017.01)
*G06T 7/181* (2017.01)

(52) U.S. Cl.
CPC ............... *G06T 7/12* (2017.01); *G06T 7/13* (2017.01); *G06T 7/181* (2017.01)

(58) Field of Classification Search
CPC .............. G06T 7/12; G06T 7/13; G06T 7/181
See application file for complete search history.

(56) References Cited

U.S. PATENT DOCUMENTS

| 4,910,786 A | * | 3/1990 | Eichel | ............ G06T 7/12 382/199 |
| 5,475,507 A | * | 12/1995 | Suzuki | ............ G06T 7/12 358/500 |

(Continued)

FOREIGN PATENT DOCUMENTS

| CN | 103440644 A | 12/2013 |
| EP | 0587301 A2 | 3/1994 |

(Continued)

OTHER PUBLICATIONS

Marina P. Cipolletti, Claudio A. Delrieux, Gerardo M.E. Perillo, M. Cintia Piccolo;"Superresolution border segmentation and measurement in remote sensing images"; Elsevier Computers & Geosciences ,2011 (Year: 2011).*

(Continued)

*Primary Examiner* — Shaghayegh Azima
(74) *Attorney, Agent, or Firm* — Mintz Levin Cohn Ferris Glovsky and Popeo, P.C.

(57) ABSTRACT

A method for scanning for borders in an image represented by pixels, the method including a first operation comprising: estimating an attribute for each of a first set of two adjacent pixel positions in the image; assessing whether a predetermined binary condition differs in respect of the two pixel positions, and if so determining that a border is present in the part of the image represented by pixels at those positions; and if a border is determined to be present in that part of the image, estimating the direction of the border as being perpendicular to a line joining the positions of the two pixels; and initiating tracing the border in that direction.

18 Claims, 5 Drawing Sheets

(56) References Cited

U.S. PATENT DOCUMENTS

| | | | |
|---|---|---|---|
| 6,289,126 B1* | 9/2001 | Ishisaka | G06T 5/20 382/205 |
| 2013/0188878 A1* | 7/2013 | Kacenjar | G06T 3/0068 382/209 |
| 2014/0072208 A1 | 3/2014 | Kenyon et al. | |
| 2016/0140392 A1* | 5/2016 | Gurbuz | G06K 9/00624 382/103 |
| 2017/0270672 A1* | 9/2017 | Overbye | G06T 7/12 |

FOREIGN PATENT DOCUMENTS

| | | | |
|---|---|---|---|
| EP | 2169622 A1 * | 3/2010 | |
| EP | 2169622 A1 | 3/2010 | |
| EP | 2615597 A1 | 7/2013 | |
| WO | WO-2008/032317 A2 | 3/2008 | |
| WO | WO-2013/186662 A1 | 12/2013 | |

OTHER PUBLICATIONS

Marina P.cipolletti,Claudio A. Delrieux, Gerardo M.E.Perillo, M. Cintia Piccolo; "Superresolution border segmentation and measurment in remote sensing images"; Elsevier Computers&Geosciences, 2011 (Year:2011).*

Phill Spiess: "Better Know an Algorithm: Marching Squares", Dec. 30, 2013 (Dec. 30, 2013).

Emanuele Feronato: "Using marching squares algorithm to trace the contour of an image | Emanuele Feronato", Mar. 1, 2013 (Mar. 1, 2013).

Marina P. Copolletti et al: "Superresolution border segmentation and measurment in remote sensing images", Computers & Geosciences, vol. 40, Mar. 1, 2012 (Mar. 1, 2012), pp. 87-96.

Chang F et al: "A linear-time component-labeling algorithm using contour tracing technique", Computer Vision and Image Understanding, Academic Press, US, vol. 93, No. 2, Feb. 1, 2004 (Feb. 1, 2004), pp. 206-220.

Peter Selinger: "Potrace: a polygon-based tracing algorithm", Sep. 20, 2003 (Sep. 20, 2003), pp. 1-16.

International Search Report issued in PCT/GB2015/051403 dated Dec. 21, 2015.

Agi et al, "An expandable VLSI processor array approaching to contour tracing", Nov. 4, 1988, conference proceedings article p. 1969-1972.

Search report issued in GB1408497.4 dated Nov. 4, 2015.

* cited by examiner

BORDER TRACING

CROSS-REFERENCES TO RELATED APPLICATIONS

This application is a national stage entry, filed under 35 U.S.C. § 371, of International Application No. PCT/GB2015/051403, filed on May 13, 2015, and claims the benefit of and priority to Great Britain Patent Application No. 1408497.4, filed on May 13, 2014, the entire contents of which are hereby incorporated herein by reference in their entireties and for all purposes.

This invention relates to tracing borders in images.

It is commonplace for computing devices to gather, process and display images. For example, many mobile phones, tablet computers and personal computers can collect images from an on-board camera, process those images and display the processed images on a screen. The processing could involve a very simple algorithm such as converting a still image from colour to greyscale. More complex algorithms might include noise reduction and tonal enhancement, and might be applied to video rather than to still photos.

An important field of image analysis is border or boundary detection. Border detection involves estimating the location of borders between regions of an image. Those regions might correspond to objects as perceived by a viewer to be represented in the image. Once the locations of the borders have been estimated additional processing could be carried out on the image. In one example, the additional processing could involve highlighting a border in a bright colour in order to draw attention to an object. This might be useful in providing night vision capabilities for vehicles. In a second example, the additional processing could involve re-colouring the area of an image surrounded by a border in order to create a visual effect. In a third example, the additional processing could involve inferring a three-dimensional relationship between objects whose borders have been estimated, either from a single image or from a series of images of a similar scene taken at different locations.

Although border detection can provide many advantages, it is a complex problem, and is particularly difficult to implement on a device that has relatively little computing power. An example of this is when border detection is to be performed on a mobile phone. The computing power of mobile phones is increasing, but it is still very limited; and since mobile phones are battery powered it is desirable to minimise the amount of energy they expend in performing video processing, to thereby improve battery life.

Examples of border detection algorithms are disclosed in EP 2 615 597 A, US 2014/072208, WO 2013/186662 and CN 103440644 A.

It would be desirable to have a border detection algorithm that was reasonably accurate and yet could be operated on a portable device such as a mobile phone to analyse real-time video of reasonable resolution. Such an algorithm could provide major advantages in the ability of such portable devices to interpret their environment in three dimensions, and provide a gateway to many desirable application features.

According to one aspect of the present invention there is provided a method for scanning for borders in an image represented by pixels, the method including a first operation comprising: estimating an attribute for each of a first set of two adjacent pixel positions in the image; assessing whether a predetermined binary condition differs in respect of the two pixel positions, and if so determining that a border is present in the part of the image represented by pixels at those positions; and if a border is determined to be present in that part of the image, estimating the direction of the border as being perpendicular to a line joining the positions of the two pixels; and initiating tracing the border in that direction.

The method may comprise deeming the border to pass between the two pixel positions. The method may comprise storing as part of a set of locations representing the location of the border in the image the mean of the two pixel positions. The method may comprise storing as part of a set of locations representing the location of the border in the image the location where a linear interpolation of position with respect to the attributes of the two pixel positions intersects a predetermined value.

The method may comprise tracing the border in the estimated direction by the steps of: selecting a second set of two adjacent pixel positions, each of those pixel positions being adjacent to a respective one of the pixel positions of the first set and offset from that pixel position of the first set in the estimated direction; estimating an attribute for each of the pixel positions of the second set; estimating a new direction of the border in dependence on the attributes of second set of pixel positions; and subsequently further tracing the border.

The first and second sets of pixel positions may together represent a contiguous block of four pixel positions. The new direction of the border may be determined such that it is perpendicular to a line joining two pixel positions of the block of four pixel positions in respect of which the predetermined binary condition differs, at least one of those two pixel positions being a pixel position of the second set.

The method may comprise storing as part of a set of locations representing the location of the border in the image the mean of the pixel positions of the first and/or second sets.

The method may comprise storing as part of a set of locations representing the location of the border in the image a position at which a linear interpolation of position with respect to the attributes of the pixel positions of the first set intersects a predetermined value.

If the predetermined binary condition for one of the pixel positions of the second set of pixel positions differs from the predetermined binary condition for both of the pixel positions of the block of four pixel positions that are adjacent to the said one of the pixel positions, the method may comprise estimating the new direction to be offset by 90° to the previously estimated border direction, the offset being in a rotational direction determined in accordance with a predetermined bias.

According to a second aspect of the invention there is provided a method for tracing a border in an image comprising, given a maintained set comprising two adjacent pixel positions on either side of the border and a border direction, repeating the steps of forming a contiguous block of four pixel positions comprising (i) the maintained set of two pixel positions and (ii) a new set of two adjacent pixel positions, each of the pixel positions of the new set being adjacent to a respective one of the pixel positions of the maintained set and offset from that respective pixel position of the maintained set in the border direction; estimating an attribute for each of the pixel positions of the new set; estimating a new direction of the border in dependence on the attributes of new set of pixel positions; and forming a new maintained set comprising two pixels selected from the block of four pixel positions.

The step of further tracing the border may comprise repeating the steps of: forming a contiguous block of four pixel positions comprising (i) a maintained set of two pixel positions selected from the block of four pixel positions formed in the previous iteration and (ii) a new set of two adjacent pixel positions, each of the pixel positions of the new set being adjacent to a respective one of the pixel positions of the maintained set and offset from that respective pixel position of the maintained set in the direction estimated in the previous iteration; estimating an attribute for each of the pixel positions of the new set; and estimating a new direction of the border in dependence on the attributes of new set of pixel positions. These steps may be performed whether the border has been detected by the method set out previously or in another way.

In each iteration of the steps of the preceding paragraph the new direction of the border may be determined such that it is perpendicular to a line joining two pixel positions of the block of four pixel positions formed in that iteration in respect of which the predetermined binary condition differs, at least one of those two pixel positions being a pixel position of the new set.

In each iteration of those steps the method may comprise deeming the border to pass between the said two pixel positions.

In each iteration of those steps the method may comprise storing as part of a set of locations representing the location of the border in the image the mean of the pixel positions of the maintained and new sets.

In each iteration of those steps the method may comprise storing as part of a set of locations representing the location of the border in the image a position at which a linear interpolation of position with respect to the attributes of the pixel positions of the maintained set intersects a predetermined value.

In each iteration of those steps the method may comprise if the predetermined binary condition for one of the pixel positions of the new set of pixel positions differs from the predetermined binary condition for both of the pixel positions of the block of four pixel positions formed in that iteration that are adjacent to the said one of the pixel positions, estimating the new direction to be offset by 90° to the previously estimated border direction, the offset being in a rotational direction determined in accordance with a predetermined bias.

The method may comprise repeating those steps multiple times, so as to circuit the border.

The method may comprise after having circuited the border selecting two adjacent pixel positions outside the border and repeating the said first operation for those pixel positions.

The attribute of each pixel position may be dependent on data defining the image as represented in a plurality of pixels neighbouring that pixel position.

The attribute of each pixel position may be based on a weighted sum of a value of the pixel at that position and plurality of pixels neighbouring that pixel position.

The attribute of each pixel position may be based on a Laplacian of Gaussian filter applied to the image and centred on the pixel position.

The attribute of each pixel position may be based on an estimation of the second-order derivative of an isotropic Gaussian convolution applied to one or more visual attributes of pixels of the image with respect to the direction of the gradient of the Gaussian The one or more visual attributes may include luminance and/or chrominance.

The said first operation may comprise: if a border is not determined to be present in that part of the image initiating a further iteration of the first operation for two adjacent pixel positions offset in a predetermined direction from the set of two adjacent pixel positions of the present iteration.

According to a second aspect of the invention there is provided a device for scanning for borders in an image represented by pixels, the device being configured to perform any one or more parts of the method set out above.

The device may comprises a camera. The image may be derived from the camera.

The present invention will now be described by way of example with reference to the accompanying drawings. In the drawings.

Figure 1:
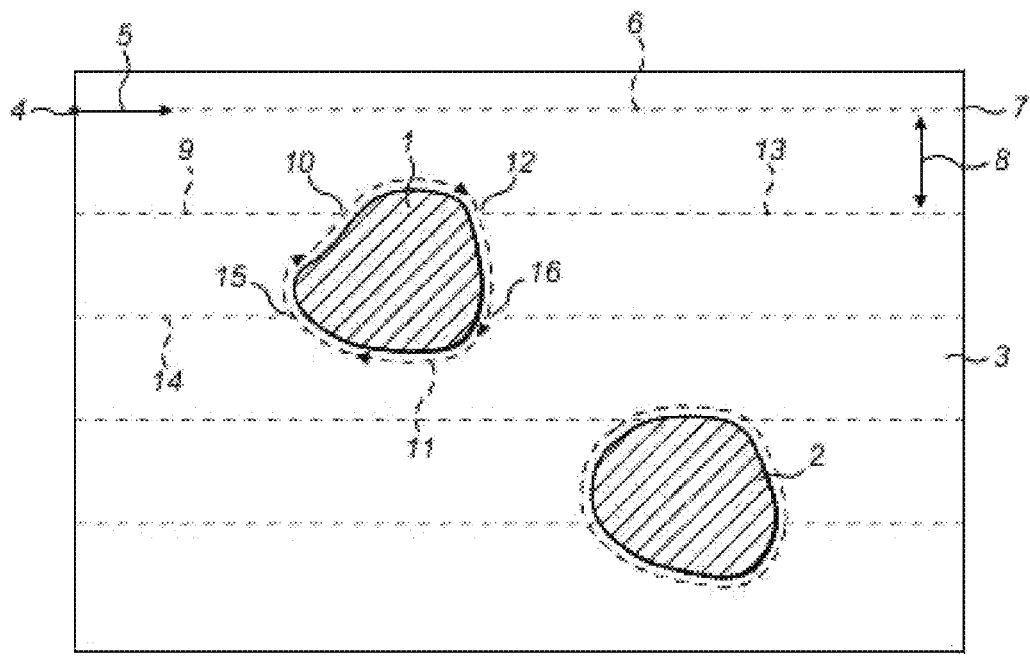
FIG. 1 illustrates the operation of one example embodiment of a border detection algorithm on an image.

In one example algorithm, an image is composed of a set of pixels arranged on an orthogonal grid. A one-by-two block of adjacent pixel positions in the image is analysed to estimate whether a border passes through it. If no border is detected then the analysis steps in an arbitrary direction to a new one-by-two block until a border is found. When a border is detected in a one-by-two block, the analysis forms a two-by-two block including that one-by-two block. It estimates the direction of the border through the one-by-two block and based on the direction of the border steps to an adjacent two-by-two block in a direction along the estimated detected border. That block is analysed in turn, and in a similar way analysis steps along the border until the border has been fully traversed or the edge of the image has been reached. As will be described below, this algorithm has been found to be capable of being implemented in a highly efficient manner.

In one embodiment the present invention provides a method for reliably detecting borders/contours in an image without processing the entire image.

An image may be considered to be formed of a grid of pixels. For any horizontal and vertical position x, y a "border function" $b(x,y)$ can be defined which returns a real number. The function $b(x,y)$ can be defined differently depending on the use case, but preferably satisfies the following constraints:

for any given x, y and image, it produces the same result each time it is calculated; and its output is at least roughly continuous (relevant if sub-pixel-accurate border detection is desired).

The function $b(x,y)$ can be defined so that two neighbouring pixel positions for which one has a negative and the other a non-negative $b(x,y)$—or more generally for which a binary condition imposed on $b(x,y)$ yields a different value for each of the two neighbouring pixel positions—are interpreted as having a border between them.

It is advantageous for the implementation of $b(x,y)$ to be faster to compute once it has already been computed for a neighbouring pixel position.

By scanning for a border and then following it when found, it is possible to map borders without computing $b(x,y)$ for every pixel position in the image.

In a first routine of the method the image is scanned to detect a border. This can be done by taking an arbitrary set of adjacent pixel positions, computing their $b(x, y)$, and checking whether the binary condition in respect of each differs, in which case there's a border crossing in between. The pattern in which sets of adjacent pixel positions are sampled can vary depending on the use case. However, it is commonly advantageous to scan along a vertical or horizontal line. Such lines may be spaced at intervals in the image. In this arrangement not every set of two directly adjacent pixel positions is scanned, and some borders may be missed. However it has been found that with suitable choice of the interval between scan lines (e.g. 32 pixels or less) no major features of the image are normally missed, and there is a great performance advantage over computing b(x, y) for every pixel position in the image.

Once a crossing has been detected, the method proceeds to a second routine of tracing the border. Given two adjacent pixel positions with a border between them, the border can begin to be traced. Two guidelines for this process can be predetermined arbitrarily:

1. Left-hand or right-hand "bias". If this bias is maintained borders can be circumnavigated in a deterministic fashion, the tracing routine returning to where it started.
2. The direction in which to first follow the border. Note that in some use cases it is desirable not to circumnavigate the border to its starting point. In those cases it may be desirable to trace in both directions from the point where the border is first detected.

Suppose that the binary condition applied to the attributes of pixel positions results in either a negative or a positive value being attributed to each pixel position that is considered, and the border is to be followed clockwise around non-negative areas, meaning we always have non-negative values on the right and negative on the left. Suppose the bias is selected to be right-hand-biased. Tracing the border then follows this pattern:

1. Given two adjacent pixel positions s0 and s1, with a negative and a non-negative b(x, y) respectively;
2. We take the neighbouring set of two adjacent pixel positions n0 and n1, which themselves are adjacent to s0 and s1 respectively, in the chosen direction of tracing.
3. If both n0 and n1 have non-negative values, we move left (with respect to the current direction). If both have negative values, we move right. If n0 has a negative and n1 has a non-negative value we move forward. Lastly, if n0 has a non-negative value and n1 has a negative value, our next direction is determined by the "bias" mentioned above; In this case we move right due to our chosen bias.
4. Lastly our next set of adjacent pixel positions s0 and s1 are chosen as follows. If we moved forward: n0 and n1. If we moved left: s0 and n0. If we moved right: n1 and s1.
5. Go to step 1 and repeat for the new s0 and s1.

When s0 and s1 once again are the same two adjacent pixel positions we started with, we have looped around and come back to the beginning.

During this process, for each iteration of the above steps a border point is recorded. This yields a set of points in sequence along the border, in this case in the clockwise direction around non-negative areas.

How each border point is recorded can differ depending on whether sub-pixel accuracy is desired. In a non-sub-pixel-accurate variant each border position can be considered to be at the average of the four pixel positions after step 2 If the pixels are considered to be at integer positions, each element of any border position will be an integer plus 0.5. If the border function b(x,y) is roughly continuous and we desire sub-pixel-accurate border detection, we can instead for each iteration record a border point as follows. For each set of adjacent pixel positions s0 and s1, we linearly interpolate their positions to estimate the real point of the zero-crossing of b(x,y). So for instance if s0's value is −1 and s1's is 2, the resulting border point will be s0's position times ⅔ plus s1's position times ⅓.

FIG. 1 shows an example image to illustrate general principles of the border detection process described in more detail below. The image contains regions 1, 2 which are distinct from a background field 3. The regions 1, 2 are considered to be bounded by borders. It is desired to detect those borders, for example for the purpose of characterising the image. An arbitrary location 4 on the image is selected, together with an initial default scan direction as shown at 5. The location can conveniently be near a corner of the image but it need not be. The initial scan direction is conveniently parallel to axes on which pixels of the image lie, but it need not be. The process involves stepping through the image from the starting location 4 in the initial scan direction 5. At each step the local region of the image is analysed to assess whether it contains a border. This analysis will be described in more detail below.

Figure 2:
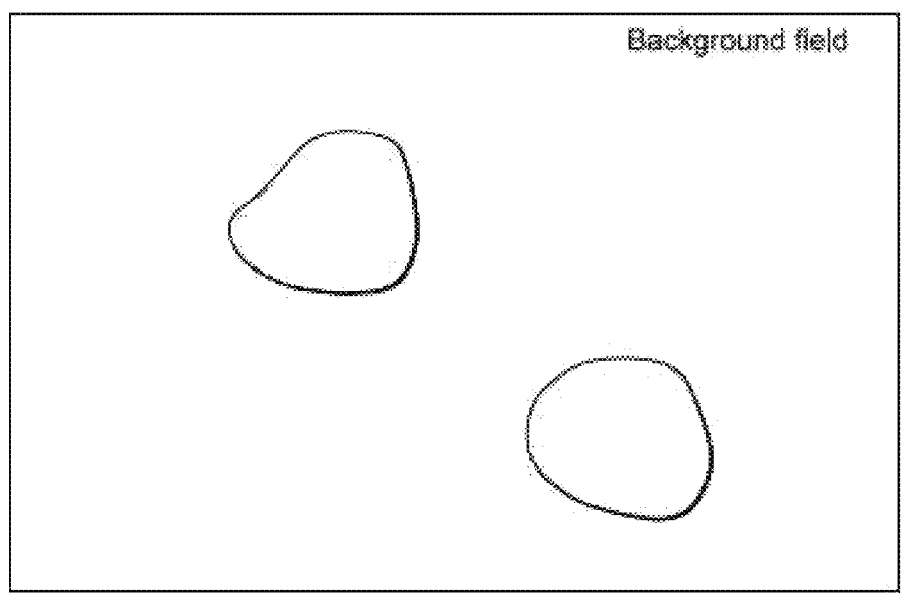
FIG. 2 illustrates borders detected in the image of FIG. 1.

In the example of FIG. 1 the scanning initially follows path 6. Once the edge of the image is met, at 7, scanning continues in the same direction but from a point on opposite side of the image and offset by a predetermined distance 8 perpendicular to the initial scan direction 5. Scanning then continues at 9 until a border is met at 10. A tracing process is then initiated to circumnavigate the detected border, as illustrated at 11. As the border is followed, the locations of points on the border are stored for later use. In one example, once tracing returns to the point 10 where the border was first detected it resumes from a point 12 which is at the extension of the path 9 on which the border was met, but on the far side of the border from the location where it was met. Scanning then continues in a similar fashion along paths 13 and 14. When the same border is met again at 15 it can be ignored and scanning is resumed from point 16 which is at the extension of the path 14 on which the border was met, but on the far side of the border from the location where it was met. By continuing in a similar fashion the process can detect the borders of regions 1 and 2 and generate a set of stored border locations as illustrated in FIG. 2. In other examples, scanning could continue in other places and/or directions in the image.

The offset 8 can be set depending on any one or more of the level of accuracy required, the expected detail in the image, the amount of time available to process the image and the processing capabilities of the apparatus on which the algorithm is running. For example, to speed up the processing a greater value could be selected for offset 8.

The present algorithm has two distinct routines. In a first routine the image is scanned until a border is detected. This scanning conveniently steps one pixel position at a time along a straight line, but the scanning could be in other than straight lines or in steps of more than one pixel position. At each step in the scanning process the algorithm determines whether a border is present. If a border is present it determines a direction in which to follow that border. It then executes a second routine, which circuits the border as illustrated at 11 in FIG. 1. The mechanism for doing this will now be described.

Figure 3:
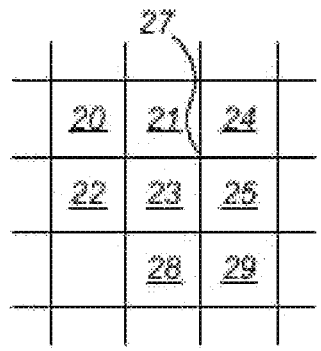
FIG. 3 shows sets of adjacent pixels.
Figure 4A:
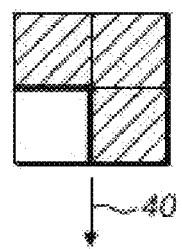
FIG. 4 shows conditions in thresholded attributes of sets of adjacent pixels.
Figure 4B:
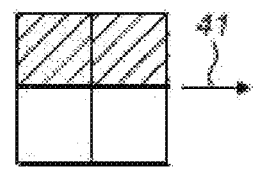
Figure 4C:
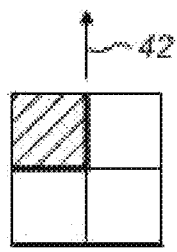
Figure 4D:
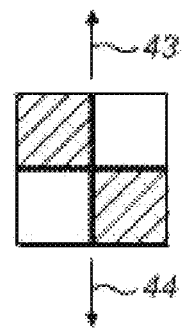

In the first routine the assessment of the presence of a border is made on the consideration of one-by-two blocks of mutually adjacent pixels, each pixel being at a respective pixel position. For example, FIG. 3 shows a set of pixels aligned on orthogonal axes. In a first iteration of the first routine the algorithm may have reached pixel positions 20 and 21. It may perform an analysis of the image based at those pixel positions to assess whether a border is present there. If no border is present then it may step to the next pair of pixel positions in the current scanning direction, i.e. to pixel positions 21 and 24. In a second iteration of the first routine it performs an analysis of the image based at those pixel positions to assess whether a border is present there. If a border is determined to be present at pixel positions 21, 24 then the direction of that border is estimated and the process initiates repetitions of the second routine in order to trace around the border.

In the second routine two-by-two blocks of pixels are considered. For a first iteration in the second routine two pixel positions that are adjacent to the two current pixel positions and offset from them in the estimated direction of the border are selected. Those may be pixel positions 23 and 25. The algorithm performs an analysis of those pixel positions to assess the next direction of the border. For a second iteration in the second routine two pixel positions adjacent to the four current pixel positions and offset from them in the estimated direction of the border are selected (those may be pixel positions 28 and 29). In the second iteration in the second routine the algorithm performs an analysis of those pixel positions to assess the next direction of the border. The algorithm proceeds in this fashion, tracing the border until it returns to the initial set of two adjacent pixel positions, in which case the border has been circumnavigated. Then the second routine can end and the first routine can resume. At each step in the second routine the algorithm steps by a distance of one pixel in a direction parallel to one of the orthogonal pixel axes. A consequence of this is that for any pixel position that needs to be analysed, an adjacent pixel position has already been analysed immediately or almost immediately prior (except for the very first pixel position in the scanning routine). This can provide significant efficiency advantages. In order to perform analysis on a pixel position, information must be gathered about its attributes. The gathering of that information may consume considerable processing power. In the described process, the function b(x, y) can be defined and implemented such that computing b(x, y) for a given pixel position is significantly faster if it's already been computed for an adjacent position.

The attribute of a pixel position that is used to help detect the presence of a border may depend on the purpose for which the image is being analysed. For example, if borders are being sought between light and dark parts of the image then the attribute could be based on a brightness value of the pixel. If borders are being sought between regions on the basis of their blueness then the attribute could be based on the blue intensity value of each pixel. In practice, the attribute is usefully a more complex measure such as the second-order rate of change (derivative) of the Gaussian, e.g. with respect to the gradient direction, or the Laplacian of Gaussian, or an approximation thereof, based on an image property such as the luminance for pixels around a pixel position in question. This will be described in more detail below.

As indicated above, in each step a one-by-two or two-by-two block of pixel positions is under consideration. The relevant attribute for each pixel in the block is considered, and is assessed against a predetermined threshold. For example, if the attribute is brightness then the threshold might be 50% of the available brightness scale. For each of the pixels in the block a determination is made as to whether the attribute for that pixel is above or below the threshold. It is convenient to form a Boolean value from each attribute and to consider a border to be present between two pixel positions if the Boolean value differs between them.

FIG. 4 illustrates representative possibilities for the result of this analysis. FIG. 4 shows two-by-two blocks of mutually adjacent pixels in which pixels above the threshold are shown shaded and pixels below the threshold are shown unshaded. It is assumed in each case that the initial tracing direction is to the right and the two-by-two blocks have been approached from the left-hand side. The tracing algorithm is configured to traverse the boundary with pixels above the threshold on the left-hand side. FIG. 4a shows the situation where both pixels in the newest one-by-two block (i.e. the pair of pixels on the right of two-by-two block 4a) are above the threshold. In that situation the tracing algorithm turns right, as shown at 40. FIG. 4b shows the situation where one pixel in the newest one-by-one block is above the threshold and one below, and where each of those is adjacent to a pixel in the pair of pixels maintained from the previous iteration (i.e. the pair of pixels on the left of two-by-two block 4b) of the same type. In that situation the tracing algorithm continues in the same direction as before, as shown at 41. FIG. 4c shows the situation where both pixels in the newest one-by-two block are below the threshold. In that situation the tracing algorithm turns left, as shown at 42. FIG. 4d shows the situation where one pixel in the newest one-by-two block is above the threshold and one below, and where each of those is adjacent to a pixel in the pair of pixels maintained from the previous iteration of the opposite type. In that situation the tracing algorithm continues according to the predetermined bias, either turning left as shown at 43 or turning right as shown at 44. When the current one-by-two block yields a situation of the form shown in FIG. 4d, consisting of two non-adjacent pixels above the threshold and two-non-adjacent pixels below the threshold, that might indicate a bifurcation of the border or a meeting of two borders. Collectively, this behaviour implements the logic described in numbered step 3 above. In each case the tracing path adopts a new path that keeps pixels of the same type (above/below the threshold) on the same side of the border.

At each step in the first routine, which scans the image to detect a boundary, the current one-by-two block is assessed. If no border has been detected in the current one-by-two block then the scanning steps one pixel in the current scan direction and the next one-by-two block is assessed, as described above with reference to FIG. 1. As indicated above, the new one-by-two block includes only one new pixel position so only one pixel position need be analysed.

In the first and second routines, when a border is detected then its location is estimated and stored. The location of the border can be estimated in a number of ways. The location that is stored may be the geometric centre of the one-by-two or two-by-two block under consideration, i.e. the mean of the pixel positions of that block: for example location 27 (see FIG. 3) for the two-by-two block consisting of pixels 21, 23, 24, 25. In another example the location of the border could be estimated to be the point where an interpolation between the determined attributes of the pixel positions of the current one-by-two block (or in other embodiments the current two-by-two block) would intersect a predetermined value. The interpolation may be a linear interpolation.

The direction in which the border is estimated to run is conveniently (i) parallel with an inferred border in the current two-by-two block and (ii) directed away from the centre of the current two-by-two block. Such directions are indicated at 40-44 in FIG. 4. One convenient approach is to treat the zones whose borders are to be traced as being regions above the threshold, the direction that is selected being that which has the pixel or pixels that are above the threshold on the left. In other embodiments the direction that is selected could be that which has the pixel or pixels that are above the threshold on the right.

The following of a border can stop when the tracing reaches a location where a border has already been detected. If that is due to the tracing reaching the point where the current border was first detected then the tracing of that border can be considered complete. The algorithm can then proceed to scan from any one-by-two blocks of the type shown in FIG. 4d that were detected during the traversal of that border, on the principle described above. Then the algorithm can continue from the far side of the border, as indicated at 12 in FIG. 1, in order to detect other borders. If the tracing of a border meets the edge of the image or another previously stored border then tracing can resume in the opposite direction from the point at which the currently traced border was first met. Tracing in the opposite direction can conveniently be achieved by adopting the opposite sense for the selection of a new tracing direction: for example with pixels above the threshold on the left, as opposed to with pixels above the threshold on the right. This can allow the algorithm to fully trace borders that do not form complete loops.

Figure 5:
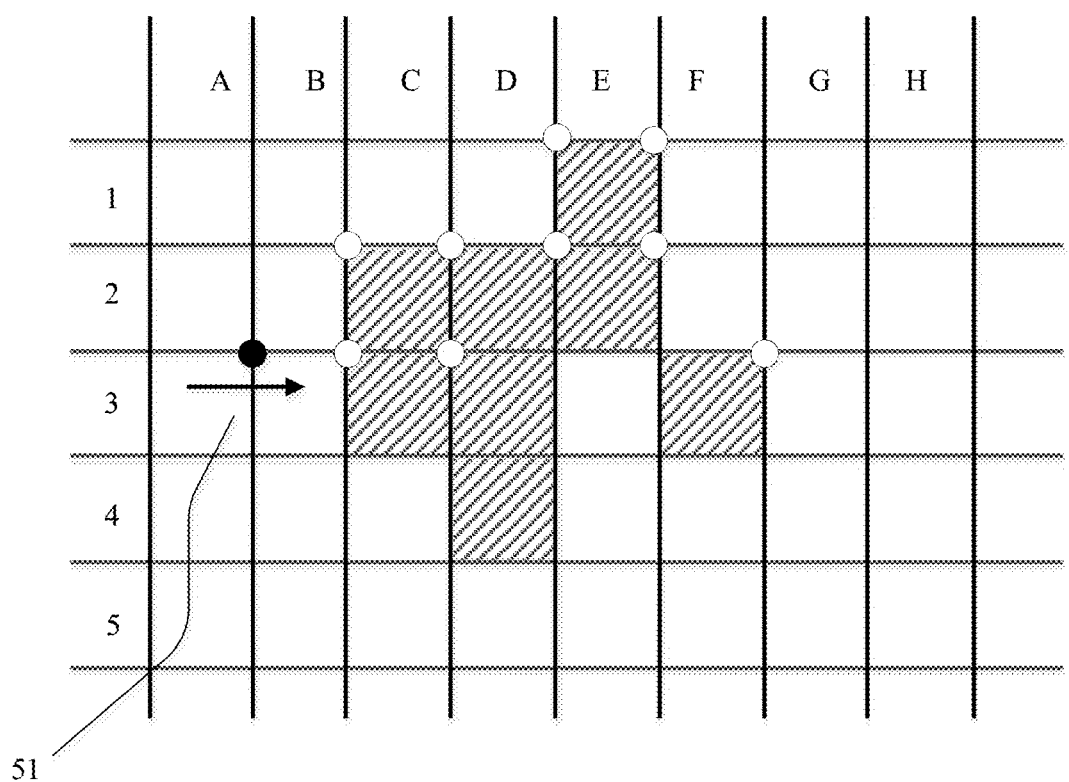
FIG. 5 illustrates the tracing of a border on an image.

An example of the border tracing process will be described with reference to FIG. 5. FIG. 5 shows an orthogonal grid of pixels, in which pixels whose attribute is above the threshold are shown shaded. Pixels in FIG. 5 will be identified by a grid reference.

Scanning starts considering pixel positions A2 and, B2, with the scanning direction being to the right as illustrated at 51. Pixel positions A2 and B2 are analysed. The attributes of both those pixel positions are on the same side of the threshold so the scanning direction is unchanged. Then pixel positions B2 and C2 are analysed. A border is detected between B2 and C2, directed up-and-down, so based on the predetermined choice of keeping attributes above the threshold on the right-hand side as we follow the border, next pixel positions B1 and C1 are considered. Their attributes are below the threshold, so the next direction is determined to be rightward. Then pixel positions D1 and D2 are considered. The algorithm proceeds in this way until the border has been circumnavigated.

At each step where a border is detected a border location is stored. In this example the border locations are stored as the geometric centres of each two-by-two block of pixel positions, the first two in the example above being (B1+C1+B2+C2)/4 and (C1+D1+C2+D2)/4. These locations are indicated by open circles as shown in FIG. 5.

As indicated above, the attributes of only two pixel positions need be computed at each step in the second routine. The attributes of the other two pixel positions of a two-by-two block can be stored from the previous step. This can help to make the algorithm highly efficient. The attributes of any pixel position previously considered can be stored indefinitely but it has been found that it is relatively efficient for computation and storage to retain attributes for only the two pixels that two successively-considered two-by-two blocks have in common.

Figure 6:
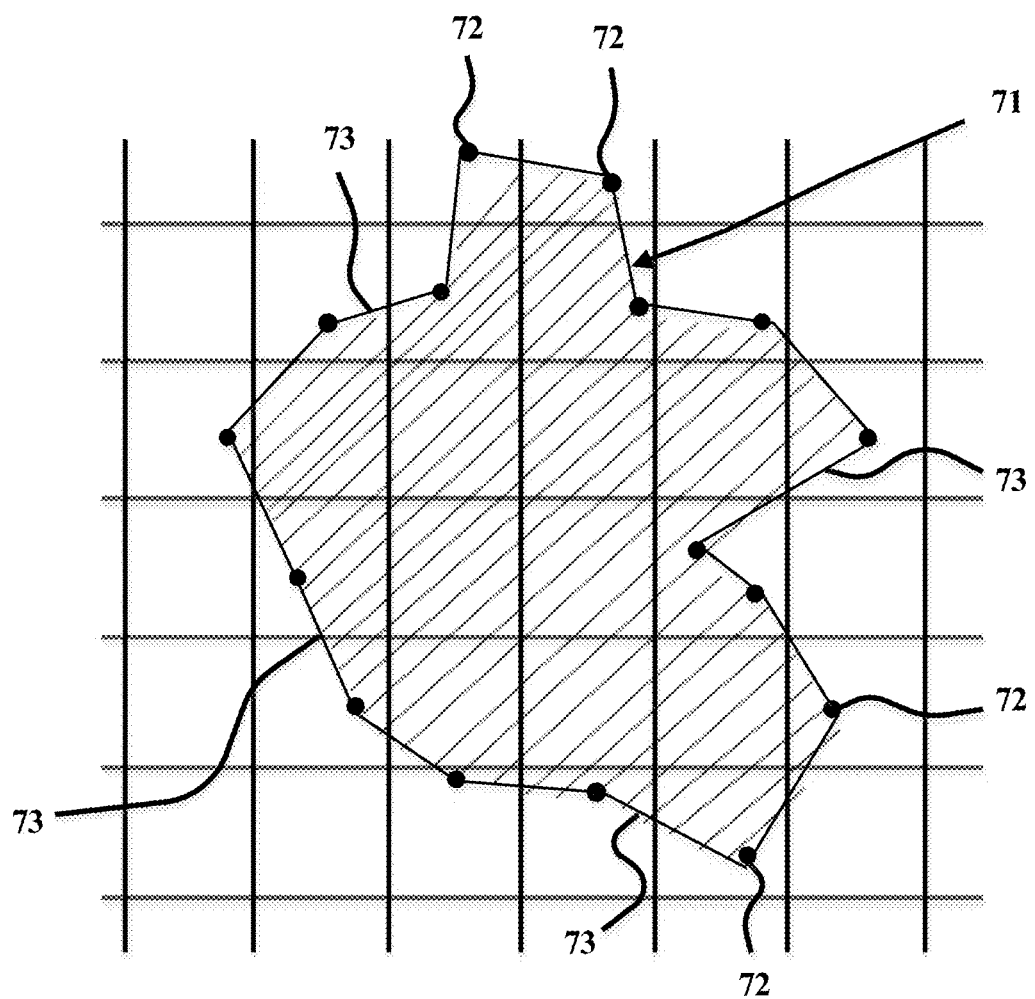
FIG. 6 shows a border formed of interpolated or averaged points.

It is convenient to store a position at each step around the border so that the border can be processed later and/or so that it can be known when the border has been fully mapped. One way to do this is to store at each such position the mean of the centres of the latest two pixels between which the boundary has been detected. In the examples of FIG. 4, this would be the lower two pixels in FIG. 4a, the right-hand two pixels in FIG. 4b and so on. Another option is to interpolate between the centres of the pixels based on an attribute of the pixels, most conveniently the same attribute as the binary decision was applied to in order to determine the presence of the border. For example, suppose one pixel position is x=20, y=40 and has attribute −9 and the adjacent pixel position is at x=21, y=40 and has attribute 2. The binary test may be whether the attribute exceeds a threshold, such as zero. On that basis a boundary can have been determined between these pixel positions. The mean position would be 20.5,40. The interpolation may estimate where at a sub-pixel level a straight line having value −9 at position 20,40 and value 2 at position 21,40 would intersect a predetermined value. Conveniently that is the same predetermined value as is used in the binary test, in this case zero, which would mean the interpolated position would be 20.82,40. FIG. 6 illustrates the effect of this in practice. FIG. 6 shows a set of pixels including a region 71 of shaded pixel positions whose attributes are above a predetermined threshold. The path made up of line segments some of which are designated 73 shows the border of the region 70 determined as a route extending between interpolated points 72 on the centres of successive two-by-two blocks traversed around the border of the region. The path made of segments 73 shows the border of the region 71 determined as a route extending between points (some of which are indicated as 72) interpolated or averaged among the attributes of the pixel positions of each one-by-two block in which a border has been detected around region 71. As indicated above, it has been found that a path formed by joining points determined from the raw or non-thresholded attributes of the pixel positions, for example interpolated, is considerably more representative of the content of an image than a path formed from raw pixel positions.

It is notable that the process of forming a border from interpolated or averaged points involves detecting the existence of a border and following it based simply on whether the relevant attribute of the pixel positions under consideration exceed a threshold, but estimating the location of the border based on the actual value of the attribute for each of those pixels. This approach has been found to be relatively computationally efficient and also relatively representative of the image content.

The attribute of each pixel position that is used in the processing described above can be selected dependent on the characteristics it is desired to analyse. In some examples, the attribute could be dependent solely on the values of that individual pixel: for example its brightness or hue. In other examples the attribute of the pixel can be determined by a function that is also dependent on the values of neighbouring pixels. In this latter case the algorithm may be variable so as to allow the relative influence of pixels distant from the pixel in question to be increased or decreased. The attribute may be determined by summing intermediate values calculated for a set of pixels neighbouring the pixels in question. The extent of those neighbouring values may be variable. The extent may be selected in dependence on the level of detail, focus or range at which the image is being considered. Each intermediate value may be weighted by a weighting factor determined according to a weighting algorithm. In one preferred example the attribute of each pixel is determined by means of the Laplacian of Gaussian filter. The Laplacian of Gaussian can be calculated by determining a weighted sum of the intensities of pixels neighbouring the pixel in question, the weights being determined according to the Laplacian of Gaussian filter centred on the pixel in question. With the pixel in question at x=0, y=0, the Laplacian of Gaussian filter gives a weighting for a pixel at x, y of:

$$-\frac{1}{\pi\sigma^4}\left(1-\frac{x^2+y^2}{2\sigma^2}\right)e^{-\frac{x^2+y^2}{2\sigma^2}}$$

Where σ represents the Gaussian standard deviation, influencing the weighting of the function with radius from the pixel in question. The weightings may be calculated in advance and stored in a look-up table for use when the attribute of a given pixel is to be computed. Weightings for a range of values of σ may be pre-computed and stored and applied as appropriate when the image is to be analysed at an appropriate level of detail. The weightings may be approximated for convenience. When estimating the attribute of a particular pixel position the weightings may conveniently be applied only to the pixels of a square block (i.e. a block whose sides are of equal pixel length) centred on that pixel position, and thus not to pixels outside that block. This can simplify the computation.

The Laplacian of Gaussian is a convenient filter for use in the present system because it tends to emphasise borders. Other filters with similar properties, including but not limited to difference-of-Gaussians, determinant of Hessian, Sobel, Canny and Canny-Deriche could be used either alone or in combination with other functions to determine the attribute of a pixel position.

Figure 7:
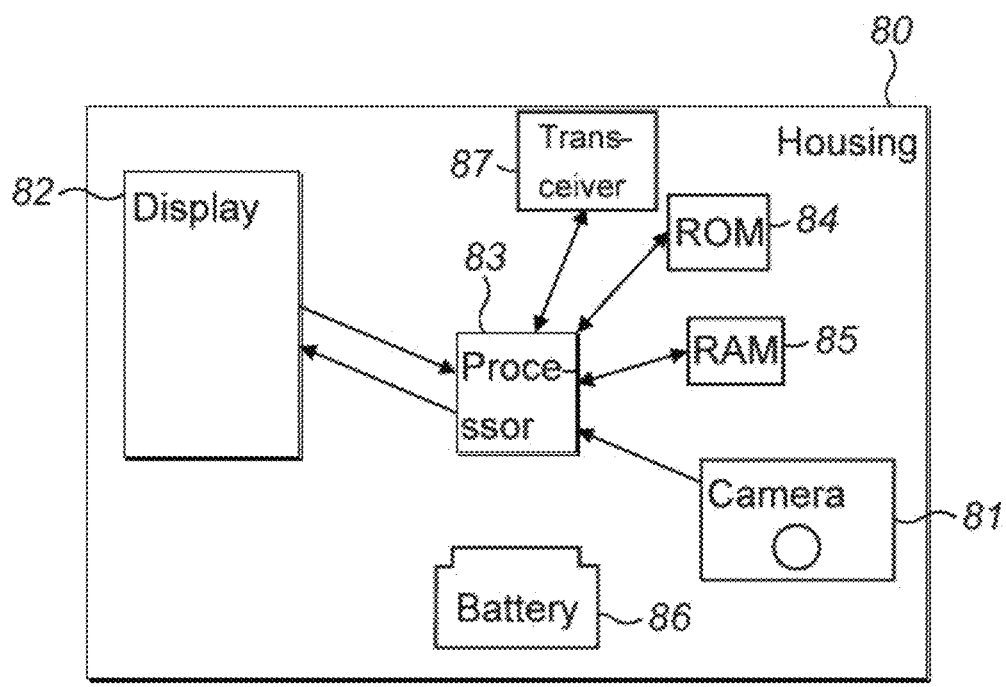
FIG. 7 shows a device suitable for image processing.

FIG. 7 illustrates apparatus for implementing the methods described above. The apparatus comprises a housing 80 in which are a camera 81, a display 82, a processor 83, a non-volatile memory or ROM 84 and a working memory or RAM 85. The apparatus is powered by a battery 86. In this example the display 82 is a touchscreen, so it provides user input to the processor 83 as well as being driven by the processor, but a separate keypad could be provided. The ROM 84 stores program code that is executable by the processor. The program code is stored in a non-transient form. The program code is executable by the processor to perform the functions described above. In operation the processor can receive an image, either from the camera 81 or from a remote communications transceiver 87. In the former case, the image could be an image captured by the camera of the environment at the location of the device. In the latter case, the image could be downloaded from the internet. The processor stores the image in RAM 85. The image could be displayed on the display 82. Once the image is stored in RAM, the processor can analyse it using an algorithm as described above. Then, dependent on the outcome of the analysis the process may perform further operations in dependence on the stored program code. For example, it could alter the image to highlight detected borders. Alternatively it could re-colour regions inside one or more detected borders, for example in response to selection of those regions by a user by means of the touchscreen. Alternatively, a user could select one of those regions, and the processor could identify other regions that are surrounded by detected borders and have attributes in common with the selected region (for example a hue that differs by less than a predetermined threshold from the average hue of the selected region) and then recolour both the selected and the identified regions similarly. Alternatively, the processor could use the position of the detected borders to infer information about the three-dimensional spatial relationship of objects represented in the image.

In the example above, the device can capture image data and process it locally. Alternatively, it could capture image data, transmit it to a remote server for analysis and then receive back from the server information related to the detected borders.

The device of FIG. 7 could be a mobile phone.

The image could be a still image or a frame or portion of a frame of a video stream.

Each pixel is a sub-unit of the image. The pixels could be monochrome or colour pixels. For display or image capture a colour image is often divided into channels of individual colours which when considered collectively represent a certain luminance and chrominance at a certain location. For the purpose of performing the algorithm described above a single pixel of the image may be considered to be formed by those channels in combination. Preferably for the purpose of performing the algorithm described above each pixel fully characterises the visual content of the image at the location of the pixel.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for finding borders in an image represented by pixels for processing of borders found in the image, the method including a first operation comprising:
    estimating an attribute for each of a first set of two adjacent pixel positions in the image;
    storing the estimated attributes for each of the two adjacent pixel positions of the first set;
    assessing whether a predetermined binary condition differs in respect of the first set of two adjacent pixel positions, the assessing step comprising determining the predetermined binary condition by comparing a scalar attribute of each of the first set of two adjacent pixel positions against a predetermined value, and if the predetermined binary condition differs in respect of the first set of two adjacent pixel positions determining that a border is present in a part of the image represented by pixels at those positions; and
    if a border is determined to be present in that part of the image, estimating a direction of the border as being perpendicular to a line joining the first set of two adjacent pixel positions; and initiating tracing the border in that direction, wherein tracing the border comprises steps of:
    selecting a second set of two adjacent pixel positions, each of those pixel positions being adjacent to a respective one of the two adjacent pixel positions of the first set and offset from that pixel position of the first set in the estimated direction;
    estimating an attribute for each of the two adjacent pixel positions of the second set;
    estimating a new direction of the border in dependence on the estimated attributes of the second set of two adjacent pixel positions and the stored estimated attributes of the first set of two adjacent pixel positions;
    and subsequently further tracing the border;

the method further comprising storing as part of a set of locations representing a location of the border in the image the location where a linear interpolation of position with respect to the scalar attributes of the two adjacent pixel positions of the first set intersects a predetermined value.

2. The method as claimed in claim 1, comprising deeming the border to pass between the two adjacent pixel positions of the first set.

3. The method as claimed in claim 1, comprising storing as part of the set of locations representing a location of the border in the image the mean of the two adjacent pixel positions of the first set.

4. The method as claimed in claim 1, wherein the first and second sets of two adjacent pixel positions together represent a contiguous block of four pixel positions and the new direction of the border is determined such that it is perpendicular to a line joining two pixel positions of the contiguous block of four pixel positions in respect of which the predetermined binary condition differs, at least one of those two pixel positions being a pixel position of the second set.

5. The method as claimed in claim 4, comprising, if the predetermined binary condition for one of the pixel positions of the second set of two adjacent pixel positions differs from the predetermined binary condition for both of the pixel positions of the contiguous block of four pixel positions that are adjacent to the one of the pixel positions of the second set of two adjacent pixel positions, estimating the new direction to be offset by 90° to a previously estimated border direction, the offset being in a rotational direction determined in accordance with a predetermined bias.

6. The method as claimed in claim 1, wherein the step of further tracing the border comprises repeating steps of:
forming a contiguous block of four pixel positions comprising (i) a maintained set of two pixel positions selected from a block of four pixel positions formed in a previous iteration and (ii) a new set of two adjacent pixel positions, each of the two adjacent pixel positions of the new set being adjacent to a respective one of the pixel positions of the maintained set and offset from that respective pixel position of the maintained set in the direction estimated in the previous iteration;
estimating an attribute for each of the two adjacent pixel positions of the new set; and
estimating a new direction of the border in dependence on the attributes of the new set of two adjacent pixel positions.

7. The method as claimed in claim 6, wherein in each iteration of the steps of claim 6 the new direction of the border is determined such that it is perpendicular to a line joining two pixel positions of the contiguous block of four pixel positions formed in that iteration in respect of which the predetermined binary condition differs, at least one of those two pixel positions being a pixel position of the new set of two adjacent pixel positions.

8. The method as claimed in claim 6, comprising repeating the steps of claim 6 multiple times, so as to circuit the border.

9. The method as claimed in claim 8, comprising after having circuited the border selecting two adjacent pixel positions outside the border and repeating the first operation for those pixel positions.

10. The method as claimed in claim 1, wherein the attribute of each pixel position is dependent on data defining the image as represented in a plurality of pixels neighbouring that pixel position.

11. The method as claimed in claim 1, wherein the attribute of each pixel position is based on a weighted sum of a value of the pixel at that position and plurality of pixels neighbouring that pixel position.

12. The method as claimed in claim 1, wherein the attribute of each pixel position is based on a Laplacian of Gaussian filter applied to the image and centred on the pixel position.

13. The method as claimed in claim 1, wherein the attribute of each pixel position is based on an estimation of a second-order derivative of an isotropic Gaussian convolution applied to one or more visual attributes of pixels of the image with respect to a direction of a gradient of the isotropic Gaussian convolution.

14. The method as claimed in claim 13, wherein the one or more visual attributes include luminance and/or chrominance.

15. The method as claimed in claim 1, wherein the first operation comprises:
if a border is not determined to be present in that part of the image initiating a further iteration of the first operation for two adjacent pixel positions offset in a predetermined direction from the first set of two adjacent pixel positions of a present iteration.

16. A device for finding borders in an image represented by pixels for processing of borders found in the image, the device comprising a processor configured to receive the image, the device further being configured to perform operations comprising:
estimating an attribute for each of a first set of two adjacent pixel positions in the image;
storing the estimated attributes for each of the two adjacent pixel positions of the first set;
assessing whether a predetermined binary condition differs in respect of the first set of two adjacent pixel positions, the assessing step comprising determining the predetermined binary condition by comparing a scalar attribute of each of the first set of two adjacent pixel positions against a predetermined value, and if the predetermined binary condition differs in respect of the first set of two adjacent pixel positions determining that a border is present in a part of the image represented by pixels at those positions; and
if a border is determined to be present in that part of the image, estimating a direction of the border as being perpendicular to a line joining the first set of two adjacent pixel positions; and initiating tracing the border in that direction, the device being configured to trace the border by:
selecting a second set of two adjacent pixel positions, each of those pixel positions being adjacent to a respective one of the two adjacent pixel positions of the first set and offset from that pixel position of the first set in the estimated direction;
estimating an attribute for each of the two adjacent pixel positions of the second set;
estimating a new direction of the border in dependence on the estimated attributes of the second set of two adjacent pixel positions and the stored estimated attributes of the first set of two adjacent pixel positions;
and subsequently further tracing the border;
the operations further comprising storing as part of a set of locations representing a location of the border in the image the location where a linear interpolation of position with respect to the scalar attributes of the two adjacent pixel positions of the first set intersects a predetermined value.

17. The device as claimed in claim 16, the device being configured to further trace the border by repeating steps of:
- forming a contiguous block of four pixel positions comprising (i) a maintained set of two pixel positions selected from a block of four pixel positions formed in a previous iteration and (ii) a new set of two adjacent pixel positions, each of the two adjacent pixel positions of the new set being adjacent to a respective one of the pixel positions of the maintained set and offset from that respective pixel position of the maintained set in the direction estimated in the previous iteration;
- estimating an attribute for each of the two adjacent pixel positions of the new set; and
- estimating a new direction of the border in dependence on the attributes of the new set of two adjacent pixel positions.

18. The device as claimed in claim 16, wherein the device comprises a camera and the image is derived from the camera.

\* \* \* \* \*